(12) United States Patent
Gorzela et al.

(10) Patent No.: US 10,839,465 B2
(45) Date of Patent: *Nov. 17, 2020

(54) POPULATING A NEW COMMUNITY FOR A SOCIAL NETWORK

(71) Applicant: International Business Machines Corporation, Armonk, NY (US)

(72) Inventors: Richard Gorzela, Billerica, MA (US); Asima Silva, Holden, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/285,567

(22) Filed: Feb. 26, 2019

(65) Prior Publication Data

US 2019/0197630 A1  Jun. 27, 2019

Related U.S. Application Data

(63) Continuation of application No. 15/916,042, filed on Mar. 8, 2018, now Pat. No. 10,296,985, which is a continuation of application No. 14/628,497, filed on Feb. 23, 2015, now Pat. No. 9,984,424.

(51) Int. Cl.
*G06Q 50/00* (2012.01)
*H04L 29/08* (2006.01)

(52) U.S. Cl.
CPC ............ *G06Q 50/01* (2013.01); *H04L 67/10* (2013.01); *H04L 67/2804* (2013.01)

(58) Field of Classification Search
CPC ...... G06Q 50/01; H04L 67/10; H04L 67/2804
See application file for complete search history.

(56) References Cited

U.S. PATENT DOCUMENTS

| 7,153,211 B2 | 12/2006 | Campaigne |
| 7,707,246 B1 | 4/2010 | Issa |
| 7,877,266 B2 | 1/2011 | Brydon et al. |
| 8,510,380 B2 | 8/2013 | Faller et al. |

(Continued)

FOREIGN PATENT DOCUMENTS

| WO | 2005074445 A2 | 8/2005 |
| WO | 2011046899 A1 | 4/2011 |

(Continued)

OTHER PUBLICATIONS

List of IBM Patents or Patent Applications Treated as Related; Feb. 26, 2019.

(Continued)

*Primary Examiner* — Abdullahi E Salad
(74) *Attorney, Agent, or Firm* — Steven L. Nichols; Fabian VanCott

(57) ABSTRACT

Populating a new community for a social network includes receiving metadata associated with a new community for a social network, determining, based on the metadata, at least one similar community related to the new community, utilizing the at least one similar community as a template to populate the new community with content, tags, and membership, and maintaining the at least one similar community and the new community by creating, reading, updating, and deleting (CRUD) the content, the tags, and the membership.

19 Claims, 5 Drawing Sheets

(56) References Cited

U.S. PATENT DOCUMENTS

| | | |
|---|---|---|
| 2004/0102995 A1 | 5/2004 | Boppana |
| 2004/0122693 A1 | 6/2004 | Hatscher et al. |
| 2007/0174110 A1 | 7/2007 | Andrews et al. |
| 2009/0144808 A1 | 6/2009 | Dhananjaya |
| 2009/0164572 A1 | 6/2009 | Charlton |
| 2009/0198686 A1 | 8/2009 | Cushman, II et al. |
| 2009/0216859 A1* | 8/2009 | Dolling .......... G06Q 30/02 709/218 |
| 2010/0185968 A1 | 7/2010 | Hsu et al. |
| 2011/0022529 A1 | 1/2011 | Barsoba |
| 2011/0022621 A1* | 1/2011 | Luo .......... G06Q 30/02 707/769 |
| 2011/0113057 A1 | 5/2011 | Lee et al. |
| 2011/0119598 A1* | 5/2011 | Traylor .......... G06Q 10/10 715/753 |
| 2011/0126132 A1 | 5/2011 | Anderson et al. |
| 2011/0307553 A1 | 12/2011 | Ghang et al. |
| 2012/0059767 A1 | 3/2012 | Uthmann |
| 2012/0102036 A1 | 4/2012 | Parker, III et al. |
| 2012/0110096 A1* | 5/2012 | Smarr .......... H04W 4/21 709/206 |
| 2012/0136900 A1* | 5/2012 | Lee .......... G06O 50/01 707/784 |
| 2012/0278091 A1 | 11/2012 | Yaseen et al. |
| 2013/0085838 A1 | 4/2013 | Tennenholtz et al. |
| 2013/0218640 A1 | 8/2013 | Kidder |
| 2013/0254397 A1* | 9/2013 | Lai .......... H04L 51/32 709/225 |
| 2013/0290414 A1 | 10/2013 | Rait et al. |
| 2013/0297699 A1 | 11/2013 | Yoshida et al. |
| 2014/0019555 A1 | 1/2014 | Cai et al. |
| 2014/0245184 A1 | 8/2014 | Cheng |
| 2014/0280544 A1 | 9/2014 | Aldereguia |
| 2014/0280551 A1* | 9/2014 | Byrd Vallieres de St. Real .......... H04L 67/22 709/204 |
| 2015/0019203 A1* | 1/2015 | Smith .......... G06F 17/27 704/9 |
| 2015/0046539 A1* | 2/2015 | Shah .......... G06Q 10/107 709/204 |
| 2016/0034537 A1 | 2/2016 | Chakra |

FOREIGN PATENT DOCUMENTS

| | | |
|---|---|---|
| WO | 2011076530 | 6/2011 |
| WO | 2013105115 | 7/2013 |

OTHER PUBLICATIONS

IBM; SPSS Text Analytics for Surveys; pp. 1-2; May 2015; http://www-01.ibm.com/software/analytics/spss/products/statistics/text-analytics-for-surveys/.

IBM; SPSS Statistics; pp. 1-2; May 2015; http://www-01.ibm.com/software/analytics/spss/products/statistics/.

Wikipedia, the free encyclopedia; Natural Language Processing; pp. 1-10; May 2015; http://en.wikipedia.org/wiki/Natural_language_processing.

* cited by examiner

POPULATING A NEW COMMUNITY FOR A SOCIAL NETWORK

BACKGROUND

The present invention relates to populating a new community, and more specifically, to populating a new community for a social network.

A social network is a network based application to enable a user to create a community. The community is created by adding users such as friends, family, experts, and colleagues to the community in an online environment. Further, once these users are added to the community, the users may share information, in the form of messages, with each of the other users in the community of the social network. The information is shared by uploading pictures, updating information, answering questions, commenting on user information, utilizing collaboration tools such as blogs, discussion forums, wikis, shared files, among other activities.

BRIEF SUMMARY

A method for populating a new community for a social network includes receiving metadata associated with a new community for a social network, determining, based on the metadata, at least one similar community related to the new community, utilizing the at least one similar community as a template to populate the new community with content, tags, and membership, and maintaining the at least one similar community and the new community by creating, reading, updating, and deleting (CRUD) the content, the tags, and the membership.

A system for populating a new community for a social network includes a presenting engine to present a user interface (UI) to a user to allow the user to specify metadata, a receiving engine to receive the metadata associated with a new community for a social network, a determining engine to determine, based on the metadata, at least one similar community related to the new community, a utilizing engine to utilize the at least one similar community as a template to populate the new community with content, tags, and membership, and a maintaining engine to maintain the at least one similar community and the new community by CRUD the content, the tags, and the membership.

A computer program product includes a computer readable storage medium, the computer readable storage medium having computer readable program code embodied therewith. The computer readable program code having computer readable program code to receive metadata associated with a new community for a social network, determine, based on the metadata, at least one similar community related to the new community, and utilize the at least one similar community as a template to populate the new community with content, tags, and membership.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
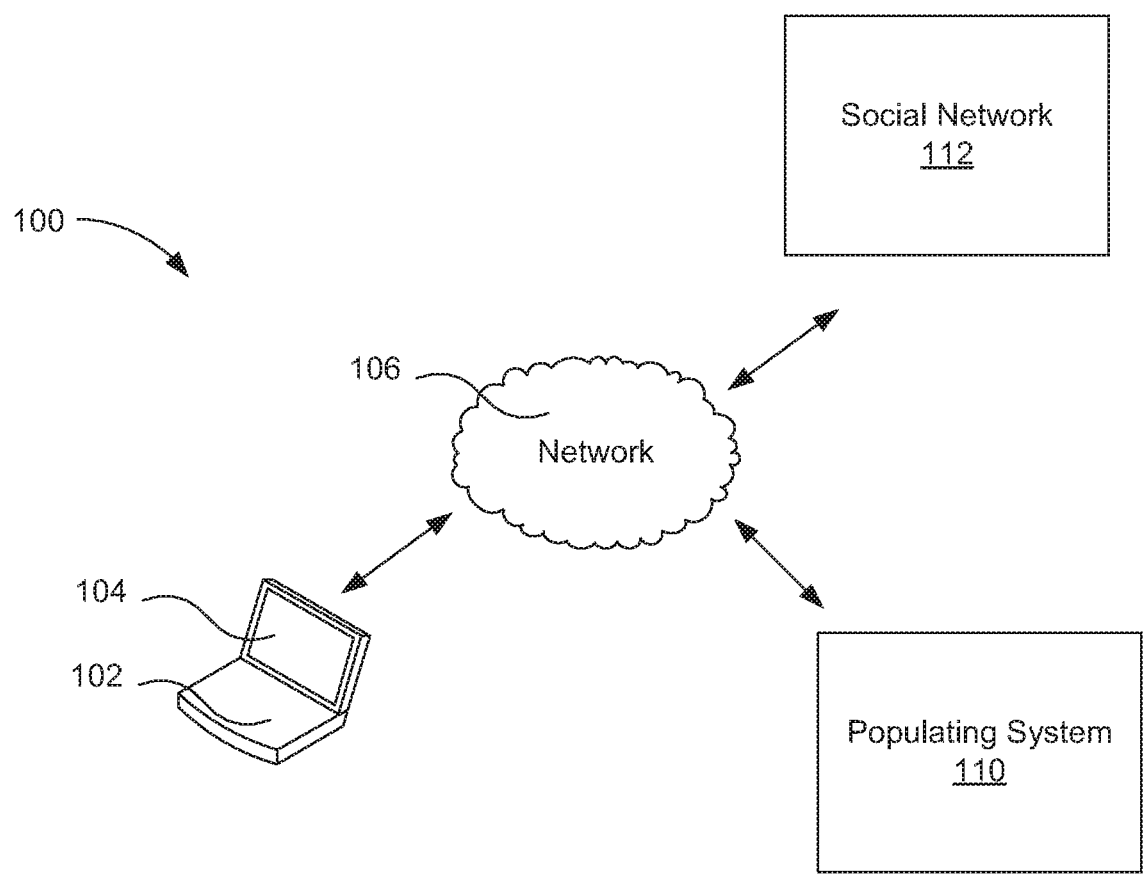
FIG. 1 is a diagram of a system for populating a new community for a social network, according to one example of principles described herein.

The present specification describes a method and system for populating a new community for a social network, such that the new community is intelligently populated with membership, tags, and content from a similar community to jumpstart the new community.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform in the specified functions or acts or carry out combinations of special purpose hardware and computer instructions.

As noted above, a social network is a network based application to enable a user to create a community. To create a community, the user explicitly identifies information to be added to the community. The information may include membership, tags, and content. Once the information is identified, the user manually adds the information to the community. Further, the user manually monitors the community to determine if the community meets the community's initial purpose. As a result, the user manually adds or deletes information in the community to meet the community's initial purpose.

Manually creating a community may be a burdensome task for the user. To meet the community's initial purpose, the user is constantly manually identifying information and adding or deleting the information. Often, there may be information in similar communities that the user is unaware of. This information in the similar communities may further meet the initial needs of the community. As a result, if the user is unable to manually identify the information, the community may not meet its initial purpose.

The principles described herein include a system and a method for populating a new community for a social network. Such a system and method includes receiving metadata associated with a new community for a social network, determining, based on the metadata, at least one similar community related to the new community, utilizing the at least one similar community as a template to populate the new community with content, tags, and membership and maintaining the at least one similar community and the new community by creating, reading, updating, and deleting (CRUD) the content, the tags, and the membership. Such a method and system allows a new community to be populated without manual intervention by the user. As a result, the new community is intelligently populated with membership, tags, and content from a similar community to jumpstart the new community.

In the specification and appended claims, the term "metadata" means initial information associated with a new community. The metadata may include a title of the new community, initial tags to populate the new community, initial membership to populate the new community, initial content to populate the new community, or combinations thereof. Further, the metadata may be from similar communities. The metadata from the similar communities may include the similar community's content, membership, title, and/or tags.

In the specification and appended claims, the term "new community" means a new group of users grouped together on a social network. The group of users may be grouped together based on similarities such as an expertise, common interests, a geographical location, a business, other similarities, or combinations thereof.

In the specification and appended claims, the term "similar community" means a group of users grouped together on a social network that resemblances a new community as defined by the new community's metadata. The resemblances may include a similar expertise, common interests, a similar geographical location, a business, other resemblances, or combinations thereof.

In the specification and appended claims, the term "template" means a mechanism to leverage content, tags, or membership from a similar community to populate a new community with. The user may select, via a user interface (UI), the content, tags, or membership from the similar community to populate a new community with.

In the specification and appended claims, the term "CRUD" means a process with basic functions for maintain a new community and at least one similar community. Via CRUD, a user may create, read, update, or delete content, tags, or membership of the new community and the at least one similar community.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of a system for populating a new community for a social network, according to one example of principles described herein. As will be described below, a populating system is in communication with a social network to receive metadata associated with a new community for a social network. The populating system determines, based on the metadata, at least one similar community related to the new community. Further, the populating system utilizes the at least one similar community as a template to populate the new community with content, tags, and membership. The populating system maintains the at least one similar community and the new community by CRUD the content, the tags, and the membership.

As illustrated in FIG. 1, the system (100) includes a social network (112). The social network (112) is a network based application to enable a user to create a community. The community is created by adding users such as friends, family, experts, and colleagues to the community in an online environment. Further, once these users are added to the community, the users may share information. More information about the social network (112) will be described in other parts of this specification.

In FIG. 1, the system (100) further includes a user device (102). The user device (102) includes a display (104). As will be described in other parts of this specification, the user device (102) allows a user to access, via a network (106), the social network (112). Further, the user device (102) allows the user to create via a UI, a new community.

As illustrated in FIG. 1, the system (100) includes a populating system (110). The populating system (110) may be in communication with the social network (112) and the user device (102) over a network (106).

The populating system (110) receives metadata associated with a new community for the social network (112). The metadata may include initial information such as initial tags, initial content, and initial membership. The metadata may be entered explicitly by the user. The user may explicitly enter the metadata via the UI. Further, the metadata may be derived from a similar community by automated analysis. This may include text analysis or utilizing natural language processing (NLP) on the similar community.

Further, the populating system (110) determines, based on the metadata, at least one similar community related to the new community. A similar community may be a group of users grouped together on the social network (112) that resembles the new community.

The populating system (110) further utilizes the at least one similar community as a template to populate the new community with content, tags, and membership. Using the at least one similar community as a template allows the new community to be intelligently populated with membership, tags, and content to jumpstart the new community. Further, the new community may be populated based on user direction. The user's direction may indicate to use one similar community as a template to populate tags for the new community and use another similar community as a template to populate membership for the new community. Further, the user's direction may specify which tags and membership are to be used to populate the new community.

Further, the populating system (110) maintains the at least one similar community and the new community by CRUD the content, the tags, and the membership. Via CRUD, a user may create, read, update, or delete content, tags, or membership of the new community and the at least one similar community. As a result, the at least one similar community and the new community may be maintained throughout their lifecycle. More information about the populating system (110) will be described in other parts of this specification.

While this example has been described with reference to the populating system being located over the network, the populating system may be located in any appropriate location. For example, the populating system may be located in a user device, a database, a social network, other locations, or combinations thereof.

Figure 2:
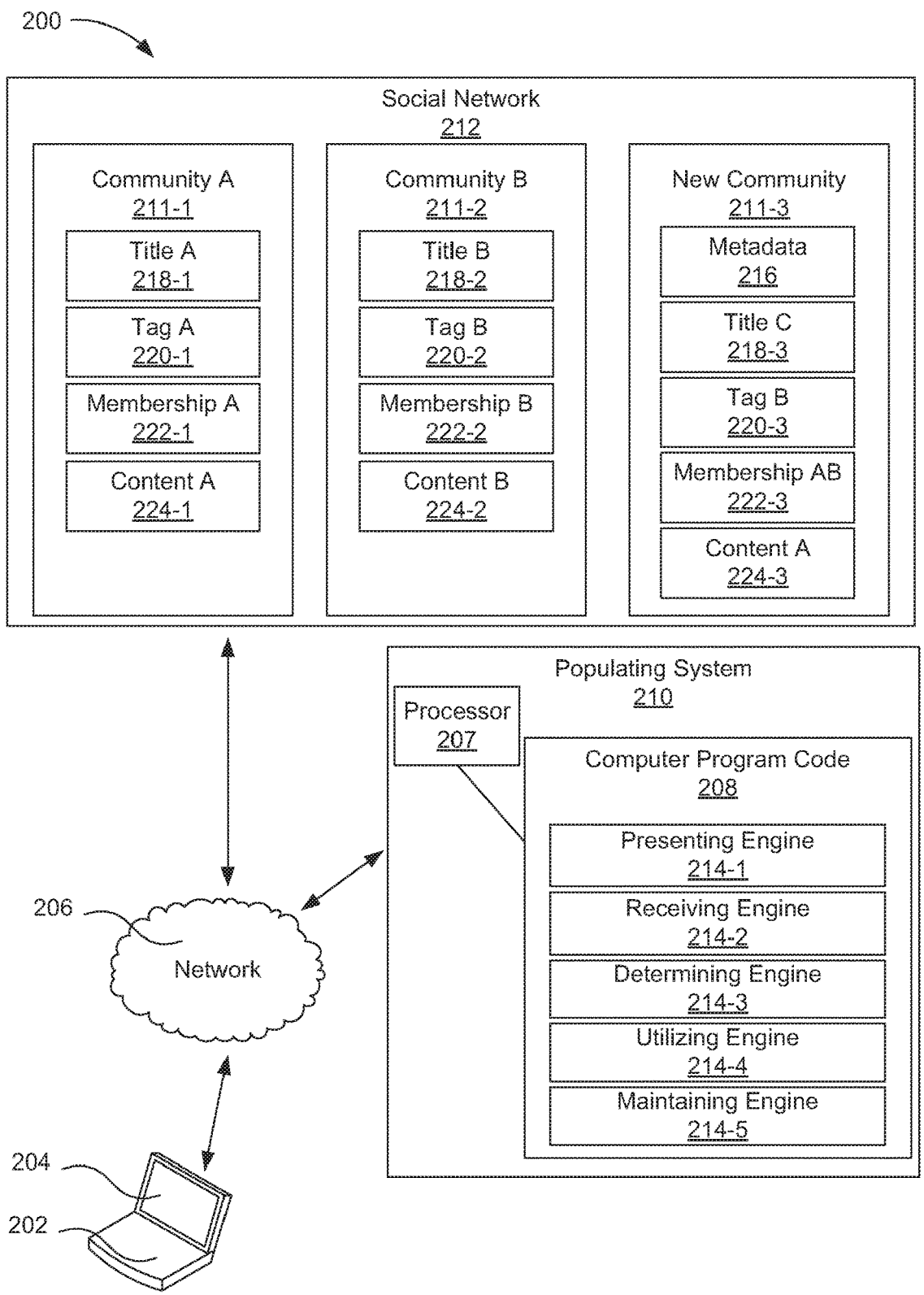
FIG. 2 is a diagram of a system populating a new community a social network, according to one example of principles described herein.

FIG. 2 is a diagram of a system populating a new community for a social network, according to one example of principles described herein. As will be described below, a populating system is in communication with a social network to receive metadata associated with a new community for a social network. The populating system determines, based on the metadata, at least one similar community related to the new community. Further, the populating system utilizes the at least one similar community as a template to populate the new community with content, tags, and membership. The populating system maintains the at least one similar community and the new community by CRUD the content, the tags, and the membership.

As illustrated in FIG. 2, the system (200) includes a social network (212). The social network (212) is a network based application to enable a user to create a community. The community is created by adding users, such as friends, family, experts, and colleagues to the community in an online environment. Further, once these users are added to the community, the users may share information, in the form of messages, with each of the other users on the community of the social network by uploading pictures, updating information, answering questions, commenting on other user's information, among other activities.

As illustrated, the social network (212) includes a number of communities (211). The communities (211) include community A (211-1) and community B (211-2). The communities (211) may include groups of users grouped together on the social network (212). The groups of users for each community (211) may have a similar expertise, a common interest, a similar geographical location, or combinations thereof. As will be described below, a populating system (210) creates a new community (211-3) based on a community A (211-1) and community B (211-2).

Each of the communities (211) includes a title (218). Community A (211-1) includes title A (218-1), Title A (218-1) may be all master inventors for company X. Community B (211-2) includes title B (218-2). Title B (218-2) may be all master inventors for company Y.

Further, each of the communities (211) includes tags (220). Community A (211-1) includes tag A (220-1). Tag A (220-1) may include assigned information, such as terms or key words, to community A (211-1) that describes and/or classifies community A (211-1). In an example, the terms master inventors and company X may be used as tags for tag A (220-1). As a result, tag A (220-1) may describe and/or classify all master inventors, company X, and content related to community A (211-1). Similarly, tag B (220-2) may include assigned information, such as terms or key words, to community B (211-2) that describes and/or classifies community B (211-2). As a result, tag B (220-B) may describe and/or classify all master inventors, company Y, and content related to community B (211-2).

Further, each of the communities (211) includes membership (222). Community A (211-1) includes membership A (222-1). Membership A (222-1) may include a list and/or sub lists of all the master inventors in community A (211-1). The list may include all the master inventors. The sub lists may categorize each of the master inventors into categories. The categories may include specific expertise, master inventors associated with a manager, employment years at company X, and other categories. Similarly, Community B (211-2) includes membership B (222-2). Membership B (222-2) may include a list and/or sub lists of all the master inventors in community B (211-2) similar to membership A (222-1) as described above.

Further, each of the communities (211) includes content (224). The content (224) may include documents, posts, threads, other content, or combinations thereof. Community A (211-1) includes content A (224-1). Content A (224-1) may include documents, posts, threads, other content, or combinations thereof that relate to community A (211-1). Similarly community B (211-2) includes content B (224-2). Content B (224-2) may include documents, posts, threads, other content, or combinations thereof that relate to community B (211-2).

As illustrated in FIG. 2, the system (200) includes a user device (202). The user device (202) allows a user to access, via a network (206), the social network (212). Further, the user device (202) allows the user to create via a UI, the new community (211-3). The UI may allow the user to specify metadata (216) such as a title of the new community, initial tags, initial membership, initial content, or combinations thereof. As a result, the metadata (216) may include an initial description of a new community, related tags, known experts in the area, some initial invited members, and related communities.

As illustrated in FIG. 2, the system (200) includes a populating system (210). In one example, the populating system (210) includes a processor (207) and computer program code (208). The computer program code (208) is communicatively coupled to the processor (207). The computer program code (208) includes a number of engines (214). The engines (214) refer to program instructions to perform a designated function. The computer program code (208) causes the processor (207) to execute the designated function of the engines (214). In other examples, the engines (214) refer to a combination of hardware and program instructions to perform a designated function. Each of the engines (214) may include a processor and memory. Alternatively, the functions of the engines (214) may be executed by one processor. The program instructions are stored in the memory and cause the processor to execute the designated function of the engine. As illustrated, the populating system (204) includes a presenting engine (214-1), a receiving engine (214-2), a determining engine (214-3), a utilizing engine (214-4), and a maintaining engine (214-5).

The presenting engine (214-1) presents a UI to the user to allow the user to specify the metadata (216). The UI may be presented via a display (204) on the user device (202). In some examples, the metadata (216) may be selected by the user. For example, if the UI includes a radio button next to a portion of metadata, the user may select the radio button to indicate to include this portion of metadata. In other examples, the metadata may be defined by the user. For example, the UI may include a number of text boxes. The text boxes allow the user to specify metadata (216). For example, the user may specify a title of the new community (211-3) as title C (218-3).

The receiving engine (214-2) receives the metadata (216) associated with the new community (211-3) for a social network (212). The receiving engine (214-2) receives metadata such as a title of the new community, initial tags, initial membership, initial content, or combinations thereof that is specified by the user via the UI.

The determining engine (214-3) determines, based on the metadata (216), at least one similar community related to the new community (211-3). The determining engine (214-3) determines, based on the metadata (216), the at least one similar community related to the new community by utilizing NLP on the metadata to determine the at least one similar community. NLP enables the populating system of FIG. 2 to derive meaning from the metadata (216). NLP may derive meaning from the metadata (216) may analyzing the metadata (216) and identify keywords, specific terms, specific initial content, specific initial membership, or combinations thereof. In another example, the determining engine (214-3) determines, based on the metadata (216), the at least one similar community related to the new community by utilizing a text analysis on the metadata of the communities (211-1, 211-2) and/or the new community (211-3) to determine the at least one similar community. Text analysis may be used to derive high-quality information from text, such as a text description of the communities (211) to determine similar communities. Text analysis may structure the text description of the communities (211), derive patterns from the structure, and evaluate and/or interpret the output. In an example, community A (211-1) may be a similar community to the new community (211-3). In another example, community B (211-2) may be a similar community to the new community (211-3). In yet another example, community A (211-1) and community B (211-2) may be a similar community to the new community (211-3).

The utilizing engine (214-4) utilizes the at least one similar community as a template to populate the new community (211-3) with content, tags, and membership. As illustrated, the new community (211-3) is populated with title C (218-3). Title C (218-3) may be all master inventor for company X and company Y. Further, the new community (211-3) is populated with tag B (220-3). Tag B (220-3) may be the same tags as tag B (220-2) in community B (211-2).

Membership AB (222-3) of the new community (211-3) is selected from at least one membership sub list of the at least one similar community, authorship related to the content, or combinations thereof. The members may be identified based on an analysis of initially identified expert's content, topics gleamed form the new community's initial description and initial tags. The members may be further identified based on content posted by potential members in similar communities. In this example, membership AB (222-3) of the new community (211-3) is selected from membership B (222-2) of community B (211-2). Further, membership AB (222-3) of the new community (211-3) is selected from membership A (222-1) of community A (211-1). As a result, membership AB (222-3) of the new community (211-3) includes users from community A (211-1) and community B (211-2).

Content A (224-3) of the new community (211-3) is determined by similar topics, relations, authorship, or combinations thereof from the at least one similar community. Further, the content may be identified based on initially identified experts, initial tags, and intelligently identified experts. In this example, content A (224-3) of the new community (211-3) is determined by similar topics, relations, authorship, or combinations thereof from community A (211-1).

The maintaining engine (214-5) maintains the at least one similar community and the new community by CRUD the content, the tags, and the membership. For example, the maintaining engine (214-5) maintains the communities (211) by creating new tags, updating the tags (220), and deleting the tags (220). Further, the maintaining engine (214-5) maintains the communities (211) by creating new membership, updating the membership (222), and deleting the membership (222). The maintaining engine (214-5) maintains the communities (211) by creating new content, updating the content (224), and deleting the content (224).

Further, the maintaining engine (214-5) maintains the at least one similar community and the new community (211-3) by deleting the at least one similar community. If community A (211-1) is a similar community to the new community (211-3), community A (211-1) may be deleted. As a result, community A (211-1) is replaced by the new community (211-3).

An overall example, of the system (200) will now be described with reference to FIG. 2. The social network (212) includes community A (211-1) and community B (211-2). Community A (211-1) may be a community that includes all master inventors for company X. Community B (211-2) may be a community that includes all master inventors for company Y. A user desires to create a new community for all master inventors for company X in a north east division.

The presenting engine (214-1) presents the UI to specify the metadata (216) of the new community (211-3). The metadata (216) may specify the initial information such as initial tags, initial content, and initial membership for all master inventors for company X in a north east division. The receiving engine (214-2) receives the metadata (216) associated with the new community (211-3) for the social network (212).

The determining engine (214-3) determines, based on the metadata (216), at least one similar community related to the new community (211-3). The similar communities may be community A (211-1). The utilizing engine (214-4) utilizes community A (211-1) as a template to populate the new community (211-3) with content, tags, and membership. The user may be prompted via the UI to determine if the user desires to select community A's tags. The user may select community A's tags as a starting point and edits community A's tags to add the north east division. The user is further prompted via the UI to select members of community A (211-1). The user may select all or a sub list of members from community A (211-1) that satisfy a filter setting. The user is prompted further by the UI to select content such as documents from community A (211-1) that may be of interest in the new community (211-3).

Although this example is not all illustrated in FIG. 2, the new community (211-3) is populated with title C (218-3). Title C (218-3) may be all master inventors for company X in a north east division. Further, the new community (211-3) is populated with tag A (220-1), Tag A (220-1) may be the same tag as tag B (220-2) in community B (211-2). Membership of the new community (211-3) is selected from membership A (222-1) of community A (211-1), Content A (224-3) of the new community (211-3) is determined by similar topics, relations, authorship, or combinations thereof from the at least one similar community. In this example, content A (224-3) of the new community (211-3) is determined by similar topics, relations, authorship, or combinations thereof from community A (211-1).

The maintaining engine (214-5) maintains the at least one similar community and the new community by CRUD the content, the tags, and the membership. For example, community A (211-1) may be deleted. As a result, community A (211-1) is deleted from the social network (212).

Figure 3:
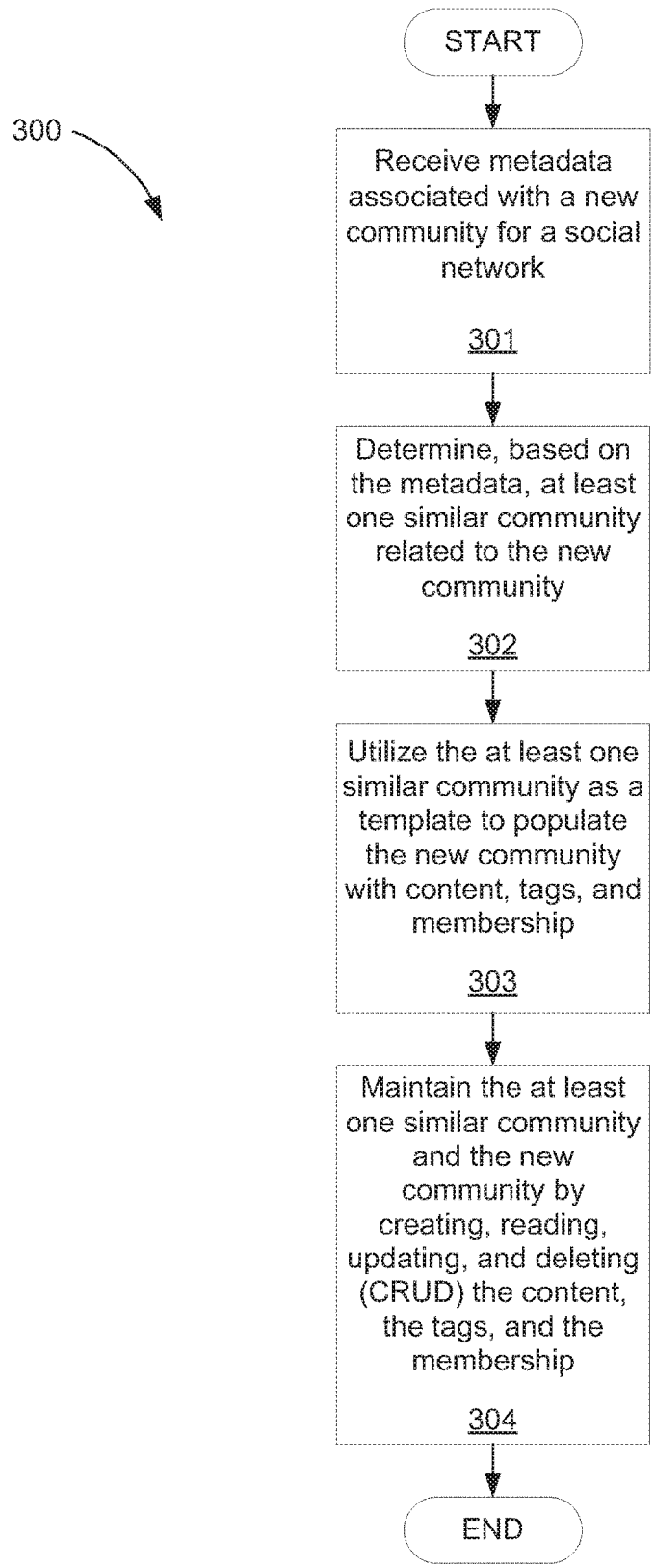
FIG. 3 is a flowchart of a method for populating a new community for a social network, according to one example of principles described herein.

FIG. 3 is a flowchart of a method for populating a new community for a social network, according to one example of principles described herein. The method (300) may be executed by the populating system (100) of FIG. 1. The method (300) may be executed by other systems (i.e. system 500 and system 600). In this example, the method (300) includes receiving (301) metadata associated with a new community for a social network, determining (302), based on the metadata, at least one similar community related to the new community, utilizing (303) the at least one similar community as a template to populate the new community with content, tags, and membership and maintaining (304) the at least one similar community and the new community by CRUD the content, the tags, and the membership.

As mentioned above, the method (300) includes receiving (301) metadata associated with a new community for a social network. The metadata may be specified via a UI and received by a receiving engine. The metadata may include initial information that defines a new community such as a new community that includes all master inventors for company X.

As mentioned above, the method (300) includes determining (302), based on the metadata, at least one similar community related to the new community. The similar community may be determined based on initial content, initial tags, and initial membership that are specified in the metadata associated with the new community. The method (300) may identify a similar community that includes all master inventors for company X in a north east division.

As mentioned above, the method (300) includes utilizing (303) the at least one similar community as a template to populate the new community with content, tags, and membership. The similar community may be used as a template for content. The similar community may be used as a template for tags. The similar community may be used as a template for membership. In keeping with the given example, all master inventors for company X in a north east division are added as members in the new community. Further, tags and content from this community may be added to the new community. As a result, the new community is intelligently populated with membership, tags, and content from a similar community to jumpstart the new community.

As mentioned above, the method (300) includes maintaining (304) the at least one similar community and the new community by CRUD the content, the tags, and the membership. The method (300) may prompt the user to delete the similar community once the new community is created.

Figure 4:
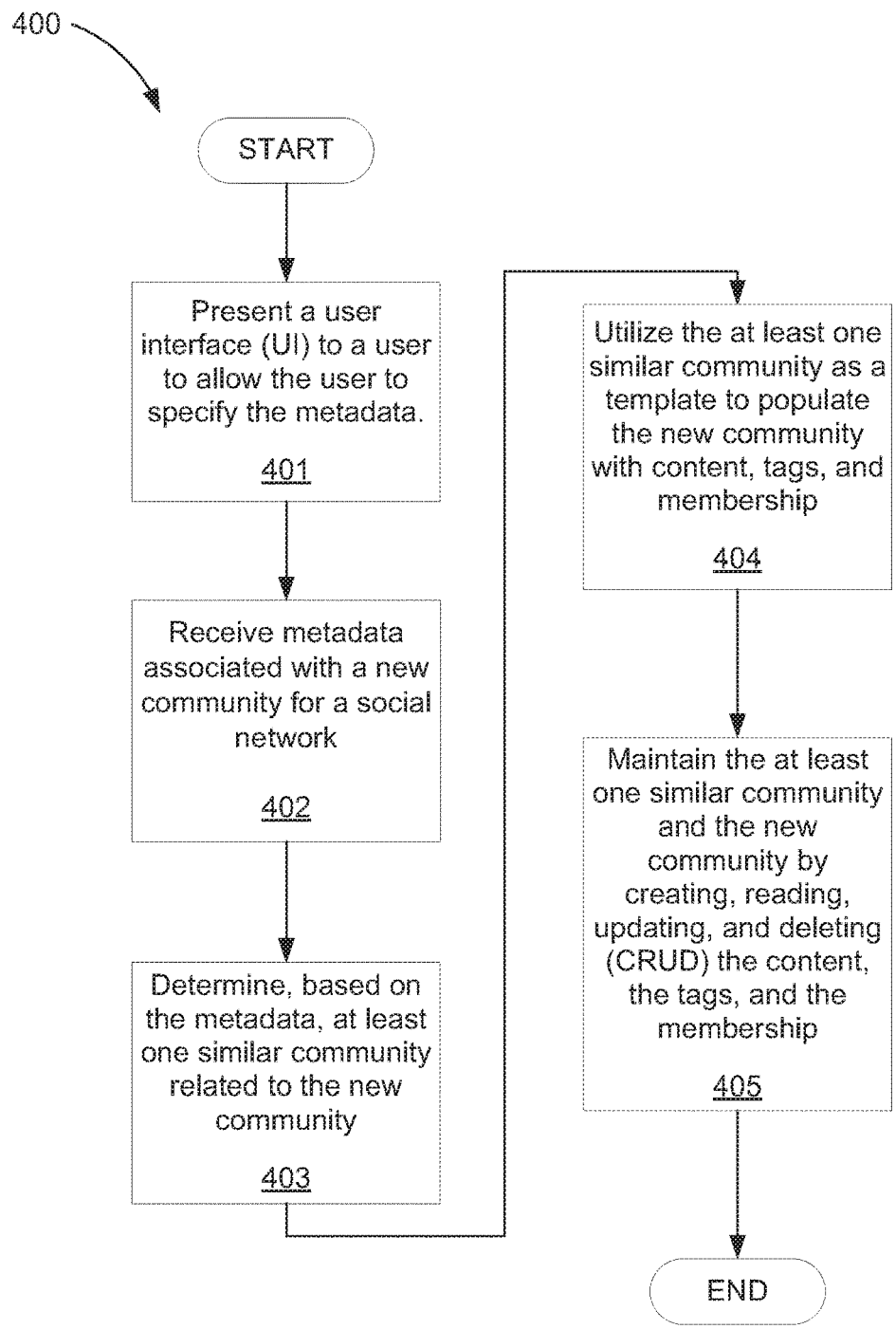
FIG. 4 is a flowchart of a method for populating a new community for a social network, according to one example of principles described herein.

FIG. 4 is a flowchart of a method for populating a new community for a social network, according to one example of principles described herein. The method (400) may be executed by the populating system (110) of FIG. 1. The method (400) may be executed by other systems (i.e. system 500 and system 600). In this example, the method (400) includes presenting (401) a UI to a user to allow the user to specify the metadata, receiving (402) metadata associated with a new community for a social network, determining (403), based on the metadata, at least one similar community related to the new community, utilizing (404) the at least one similar community as a template to populate the new community with content, tags, and membership and maintaining (405) the at least one similar community and the new community by CRUD the content, the tags, and the membership.

As mentioned above, the method (400) includes presenting (401) a UI to a user to allow the user to specify the metadata. The UI includes methods and techniques to allow the user to specify the metadata. The methods and techniques may include radio buttons to select specific metadata, textboxes to add descriptions of the new community, other methods and techniques, or combinations thereof.

Figure 5:
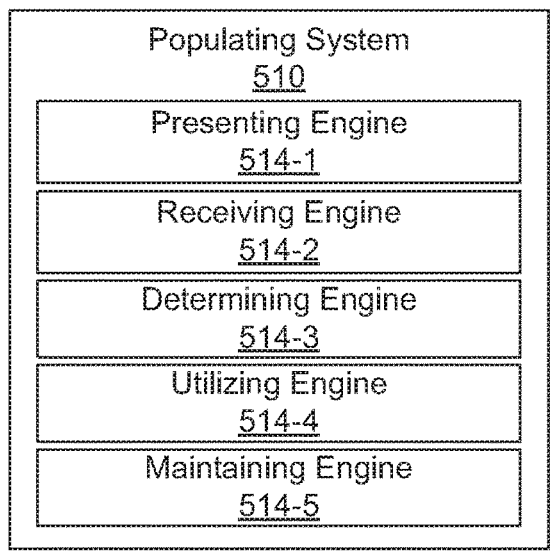
FIG. 5 is a diagram of a populating system, according to the principles described herein.

FIG. 5 is a diagram of a populating system, according to the principles described herein. The populating system (510) includes a presenting engine (514-1), a receiving engine (514-2), a determining engine (514-3), a utilizing engine (514-4), and a maintaining engine (514-5). The engines (514) refer to a combination of hardware and program instructions to perform a designated function. Alternatively, the engines (514) may be implemented in the form of electronic circuitry (e.g., hardware). Each of the engines (514) may include a processor and memory. Alternatively, one processor may execute the designated function of each of the engines (514). The program instructions are stored in the memory and cause the processor to execute the designated function of the engine.

The presenting engine (514-1) presents a user interface UI to a user to allow the user to specify the metadata. The presenting engine (514-1) may present the UI to the user during the lifecycle of the new community. As a result, the presenting engine (514-1) presents the UI to the user to allow the user to maintain the new community.

The receiving engine (514-2) receives metadata associated with a new community for a social network. The receiving engine (514-2) receives metadata at time of creation of the new community. The receiving engine (514-2) receives metadata during the lifecycle of the new community.

The determining engine (514-3) determines, based on the metadata, at least one similar community related to the new community. The determining engine (514-3) utilizes NLP on the metadata to determine the at least one similar community.

The utilizing engine (514-4) utilizes the at least one similar community as a template to populate the new community with content, tags, and membership. The membership of the new community is selected from at least one membership sub list of the at least one similar community, authorship related to the content, or combinations thereof.

The maintaining engine (514-5) maintains the at least one similar community and the new community by CRUD the content, the tags, and the membership. The maintaining engine (514-5) may maintain a similar community by deleting the similar community.

Figure 6:
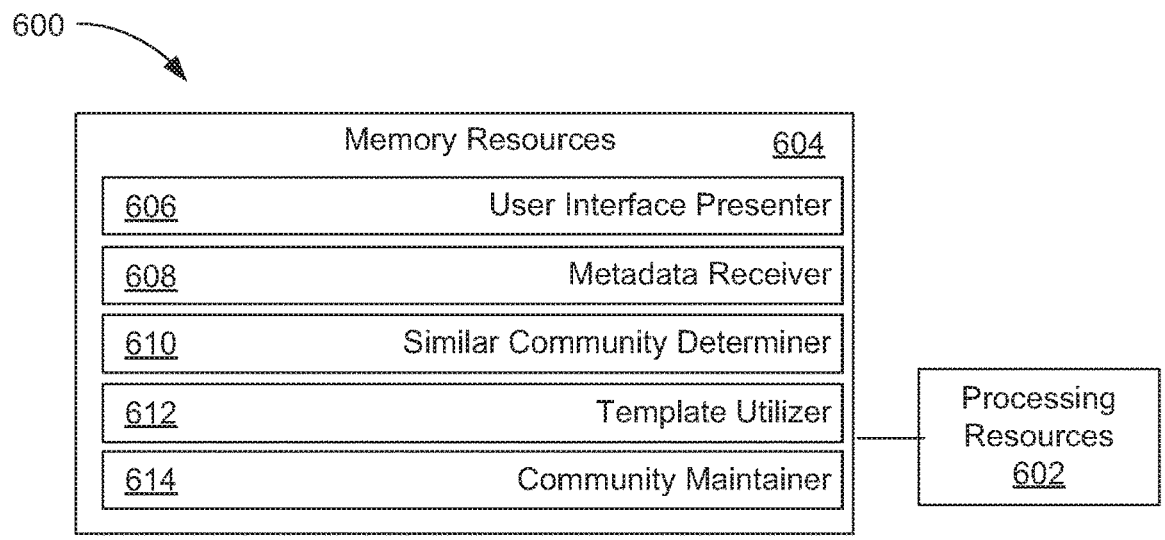
FIG. 6 is a diagram of a populating system, according to the principles described herein.

FIG. 6 is a diagram of a populating system, according to the principles described herein. In this example, the populating system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the populating system (600). The programmed instructions shown stored in the memory resources (604) include a user interface presenter (606), a metadata receiver (608), a similar community determiner (610), a template utilizer (612), and a community maintainer (614).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The user interface presenter (606) represents programmed instructions that, when executed, cause the processing resources (602) to present a UI to a user to allow the user to specify the metadata. The metadata receiver (608) represents programmed instructions that, when executed, cause the processing resources (602) to receive metadata associated with a new community for a social network.

The similar community determiner (610) represents programmed instructions that, when executed, cause the processing resources (602) to determine, based on the metadata, at least one similar community related to the new community. The template utilizer (612) represents programmed instructions that, when executed, cause the processing resources (602) to utilize the at least one similar community as a template to populate the new community with content, tags, and membership. The community maintainer (614) represents programmed instructions that, when executed, cause the processing resources (602) to maintain the at least one similar community and the new community by CRUD the content, the tags, and the membership.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component.

The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, the populating system (600) may be implemented on a user device, on a server, on a collection of servers, or combinations thereof.

The populating system (600) of FIG. 6 may be part of a general purpose computer. However, in alternative examples, the populating system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method for populating a new community for a social network, the method comprising:
  receiving metadata that defines a new community for a social network, the metadata comprising at least one of: tags for the new community, membership of the new community and content for the new community;
  determining, based on the metadata, a plurality of existing similar communities in a social network that are related to the new community based on analysis of the metadata and metadata from each of the plurality of existing similar communities;
  utilizing the plurality of existing similar communities in a social network as a template to populate the new community with content, tags, and membership, including presenting, to a user, content and membership of the plurality of existing similar communities in a social network and receiving from the user a selection of at least two of the plurality of existing similar communities to provide, respectively, one of membership, content and tags to be included in the new community; and
  initiating the new community based on the at least two of the plurality of existing similar communities.

2. The method of claim 1, further comprising:
  performing Natural Language Processing (NLP) on data of existing communities to determine plurality of existing similar communities in a social network that are related to the new community.

3. The method of claim 1, wherein determining, based on the metadata, the plurality of existing similar communities in a social network related to the new community comprises utilizing text analysis of existing communicates in a social network.

4. The method of claim 1, wherein the content comprises documents and user posts.

5. The method of claim 1, further comprising maintaining the new community by creating, reading, updating, and deleting (CRUD) the content, the tags, and the membership.

6. The method of claim 1, wherein the metadata comprises a title of the new community.

7. The method of claim 1, further comprising increasing membership of the new community based on authorship related to the content of the new community.

8. The method of claim 1, further comprising increasing content of the new community by identifying additional content on topics from content of one of the plurality of existing similar communities.

9. A system for populating a new community for a social network, the system comprising:
  a computer having a user interface, the user interface for receiving metadata that defines a new community for a social network, the metadata comprising at least one of: tags for the new community, membership of the new community and content for the new community;
  a network interface of the computer for accessing the social network, the computer to use the network interface for determining at least one similar community already in the social network that is related to the new community based on the metadata;
  a processor of the computer programmed for utilizing the at least one similar community as a template to populate the new community with content, tags, and membership, including presenting, to a user, content and membership of the at least one similar community and receiving from the user a selection of members and content of the at least one similar community to be included in the new community; and
  the processor of the computer further programmed for initiating the new community on the social network with content, tags or membership based on the at least one similar community;
  wherein the processor is further programmed to add to membership of the new community based on authorship related to the content of the new community.

10. The system of claim 9, the processor further programmed to:
  access a database of existing communities, each existing community already comprising membership and content, and
  perform Natural Language Processing (NLP) on the data of the existing communities to determine, using and based on the metadata associated with the new community, at least one similar community from among the existing communities that is related to the new community.

11. The system of claim 9, further comprising a natural language processor, wherein determining, based on the metadata, the at least one similar community related to the new community comprises utilizing natural language processing (NLP).

12. The system of claim 9, wherein the processor is further programmed to delete the at least one similar community after initiating the new community.

13. The system of claim 9, wherein the processor is further programmed to maintain the new community by creating, reading, updating, and deleting (CRUD) the content, the tags, and the membership.

14. The system of claim 9, wherein the metadata comprises a title of the new community.

15. The system of claim 9, wherein the processor is further programmed to add to content of the new community by identifying additional content on topics from content of the at least one similar community.

16. A method for populating a new community for a social network using:
   a processor;
   a memory storing programming for the processor; and
   a network interface for the processor to exchange data with a computer network;
   the method comprising:
      receiving metadata through a user interface defining the new community, the metadata comprising any of tags for the new community, membership of the new community and content for the new community;
      accessing a database of existing communities, each existing community already comprising membership and content, to identify, using and based on the metadata associated with the new community, at least one matching community from among the existing communities that is related to the new community based on the metadata associated with the new community;
      utilizing the at least one matching community as a template to populate the new community with any of content, tags, and membership based on the at least one matching community so that a database supporting the new community is initiated with data from the matching community; and
      maintaining the new community; and
      deleting the at least one matching community and replacing the at least one matching community with the new community.

17. The method of claim 16, wherein maintaining the new community comprises any of creating, reading, updating, and deleting (CRUD) any of the content, the tags, and the membership.

18. The method of claim 16, further comprising operating the user interface to present, to a user, content and membership of the at least one matching community and to receive from the user a selection of members and content of the at least one matching community to be included in the new community.

19. The method of claim 16, further comprising:
   increasing membership of the new community based on authorship related to the content of the new community; and
   increasing content of the new community by identifying additional content on topics from content of the at least one similar community.

* * * * *